(12) United States Patent
Fujita et al.

(10) Patent No.: US 11,325,422 B2
(45) Date of Patent: May 10, 2022

(54) TYRE

(71) Applicant: Sumitomo Rubber Industries, Ltd., Hyogo (JP)

(72) Inventors: Masayuki Fujita, Kobe (JP); Koichi Nakajima, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 427 days.

(21) Appl. No.: 16/441,415

(22) Filed: Jun. 14, 2019

(65) Prior Publication Data

US 2020/0016935 A1 Jan. 16, 2020

(30) Foreign Application Priority Data

Jul. 12, 2018 (JP) .............................. JP2018-132544

(51) Int. Cl.
*B60C 11/03* (2006.01)
*B60C 11/12* (2006.01)
*B60C 11/13* (2006.01)

(52) U.S. Cl.
CPC ...... *B60C 11/0306* (2013.01); *B60C 11/0302* (2013.01); *B60C 11/033* (2013.01); *B60C 11/0304* (2013.01); *B60C 11/12* (2013.01); *B60C 11/1236* (2013.01); *B60C 11/1323* (2013.01); *B60C 2011/0341* (2013.01); *B60C 2011/0381* (2013.01); *B60C 2011/0388* (2013.01); *B60C 2011/1338* (2013.01)

(58) Field of Classification Search
CPC ............. B60C 11/1338; B60C 11/1323; B60C 11/0302; B60C 11/0304; B60C 11/0306; B60C 11/033; B60C 11/12; B60C 11/1236; B60C 11/125; B60C 11/1263; B60C 11/1392; B60C 2011/0341; B60C 2011/0381; B60C 2011/0388
See application file for complete search history.

(56) References Cited

U.S. PATENT DOCUMENTS

2007/0284026 A1 * 12/2007 Suzuki .................... B60C 11/04
152/209.18
2019/0344623 A1 * 11/2019 Nakajima ........... B60C 11/1323

FOREIGN PATENT DOCUMENTS

EP  2777949 A2 * 9/2014 ........... B60C 11/033
JP  2003146024 A * 5/2003 ..... B60C 2011/1338
(Continued)

*Primary Examiner* — Katelyn W Smith
*Assistant Examiner* — Philip N Schwartz
(74) *Attorney, Agent, or Firm* — Studebaker & Brackett PC

(57) ABSTRACT

A tyre has a tread portion having a tread ground contacting surface and a main groove having a bottom surface and two groove wall surfaces extending outwardly in a tyre radial direction from the bottom surface. In a lateral cross section perpendicular to a length direction, at least one groove wall surface has an inner groove wall portion connected with the bottom surface and a protruding portion connected with the inner groove wall portion and having a protruding end protruding inwardly in a groove width direction from a groove reference line obtained by extending the inner groove wall portion. The protruding portion has an inclined surface portion extends obliquely between the protruding end and the tread ground contacting surface. When the tread portion in a reference state is loaded with a tyre load of 1.20 times a standard tyre load, the whole inclined surface portion contacts a flat surface.

19 Claims, 11 Drawing Sheets

(56) References Cited

FOREIGN PATENT DOCUMENTS

| JP | 2009067255 A | * | 4/2009 | ......... B60C 11/0304 |
| JP | 2013147115 A | * | 8/2013 | ............. B60C 11/04 |
| JP | 2015-024797 A | | 2/2015 | |

* cited by examiner

TYRE

TECHNICAL FIELD

The present invention relates to a tyre, in particular to a tyre having a tread portion provided with main grooves.

BACKGROUND ART

Japanese Unexamined Patent Application Publication No. 2015-024797 (Patent Literature 1) has proposed a pneumatic tyre having a tread portion provided with a pair of center main grooves. In the pneumatic tyre disclosed in the Patent Literature 1, improvement of wet performance by the center main grooves has been expected.

SUMMARY OF THE INVENTION

However, the pneumatic tyre of the Patent Literature 1 has not been sufficient for the improvement of uneven wear resistance performance and steering stability, therefore, there has been a demand for further improvement.

The present invention was made in view of the above, and a primary object thereof is to provide a tyre capable of improving the uneven wear resistance performance and the steering stability.

In one aspect of the present invention, a tyre comprises a tread portion, wherein the tread portion is provided with a tread ground contacting surface and at least one main groove having an opening at the tread ground contacting surface and extending continuously in a tyre circumferential direction, in a reference state in which the tyre is mounted on a standard rim, inflated to a standard inner pressure, and placed on a flat surface with zero camber angle, when the tread portion of the tyre is loaded with a standard tyre load, the tread ground contacting surface is in contact with the flat surface, the at least one main groove has a bottom surface and two groove wall surfaces extending outwardly in a tyre radial direction from the bottom surface, in a lateral cross section taken perpendicular to a length direction of the at least one main groove, at least one of the two groove wall surfaces is provided with an inner groove wall portion connected with the bottom surface and a protruding portion connected with the inner groove wall portion and having a protruding end protruding inwardly in a groove width direction from a groove reference line obtained by extending the inner groove wall portion, the protruding portion has an inclined surface portion which is inclined and extends between the protruding end and the tread ground contacting surface, and in the reference state, when a tyre load of 1.20 times the standard tyre load is applied to the tread portion, the whole inclined surface portion is in contact with the flat surface.

In another aspect of the invention, it is preferred that in the reference state, when a tyre load larger than the standard tyre load is applied to the tread portion, at least a part of the inclined surface portion is in contact with the flat surface.

In another aspect of the invention, it is preferred that the protruding portion has a protruding groove wall portion extending between the inner groove wall portion and the protruding end, and the protruding groove wall portion includes a portion which is inclined inwardly in the groove width direction as it goes outwardly in the tyre radial direction.

In another aspect of the invention, it is preferred that the inner groove wall portion is inclined outwardly in the groove width direction as it goes outwardly in the tyre radial direction.

In another aspect of the invention, it is preferred that the inclined surface portion is inclined at an angle in a range of from 70 to 80 degrees with respect to a tread normal line passing through the protruding end.

In another aspect of the invention, it is preferred that a position of the tyre when mounted on a vehicle is specified and when the tyre is mounted on a vehicle, the tread portion has an inner tread edge positioned on an inner side of the vehicle and an outer tread edge positioned on an outer side of the vehicle, the two groove wall surfaces consist of a first groove wall surface positioned on a side of the outer tread edge and a second groove wall surface positioned on a side of the inner tread edge, and the second groove wall surface is provided with the protruding portion.

In another aspect of the invention, it is preferred that the first groove wall surface is not provided with the protruding portion.

In another aspect of the invention, it is preferred that the tread portion is provided with an inner tread portion defined between a tyre equator and the inner tread edge and an outer tread portion defined between the tyre equator and the outer tread edge, and a land ratio of the outer tread portion is larger than a land ratio of the inner tread portion.

DESCRIPTION OF THE PREFERRED EMBODIMENT

An embodiment of the present invention will now be described in conjunction with accompanying drawings.

Figure 1:
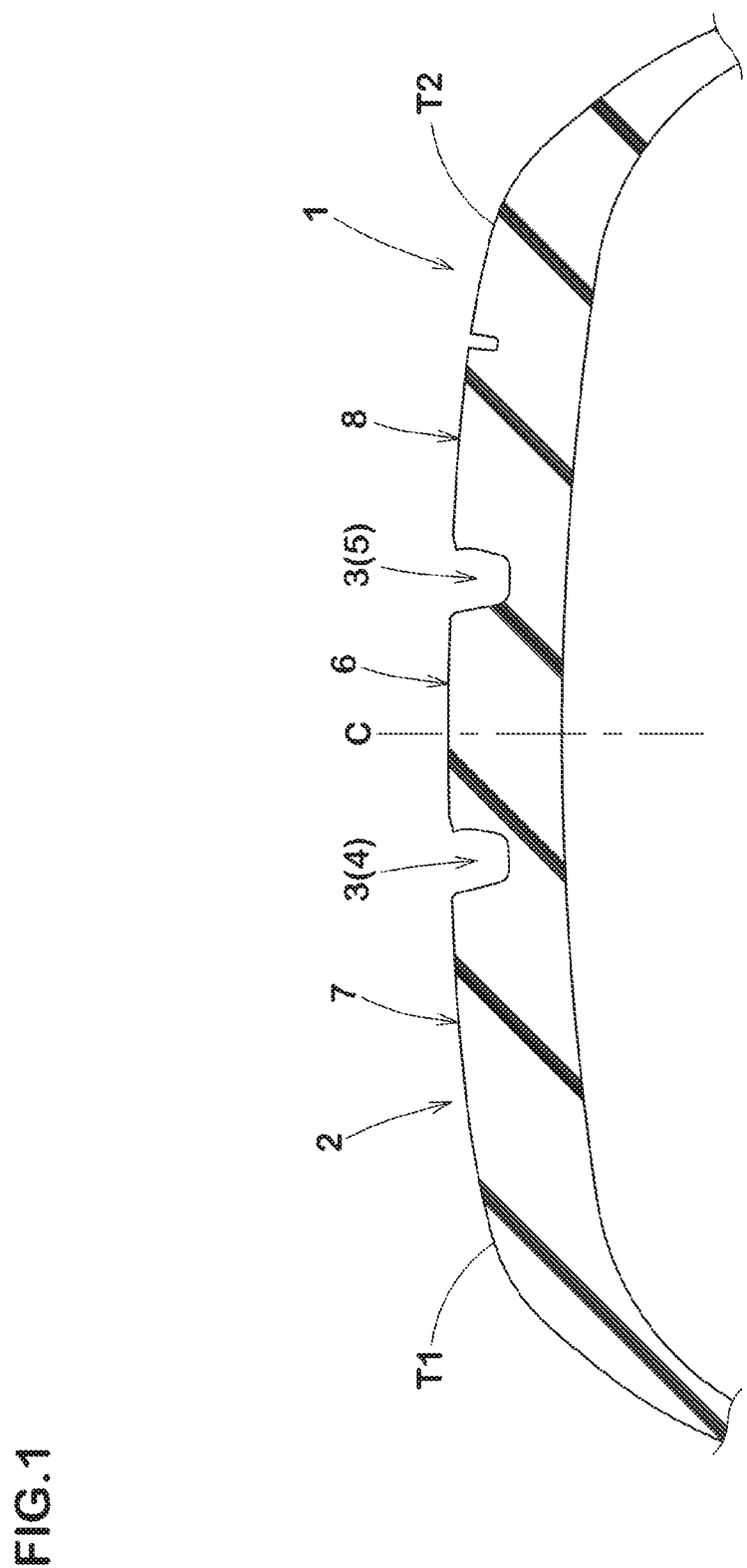
FIG. 1 is a lateral cross-sectional view of a tread portion of a tyre according to an embodiment of the present invention.
Figure 2:
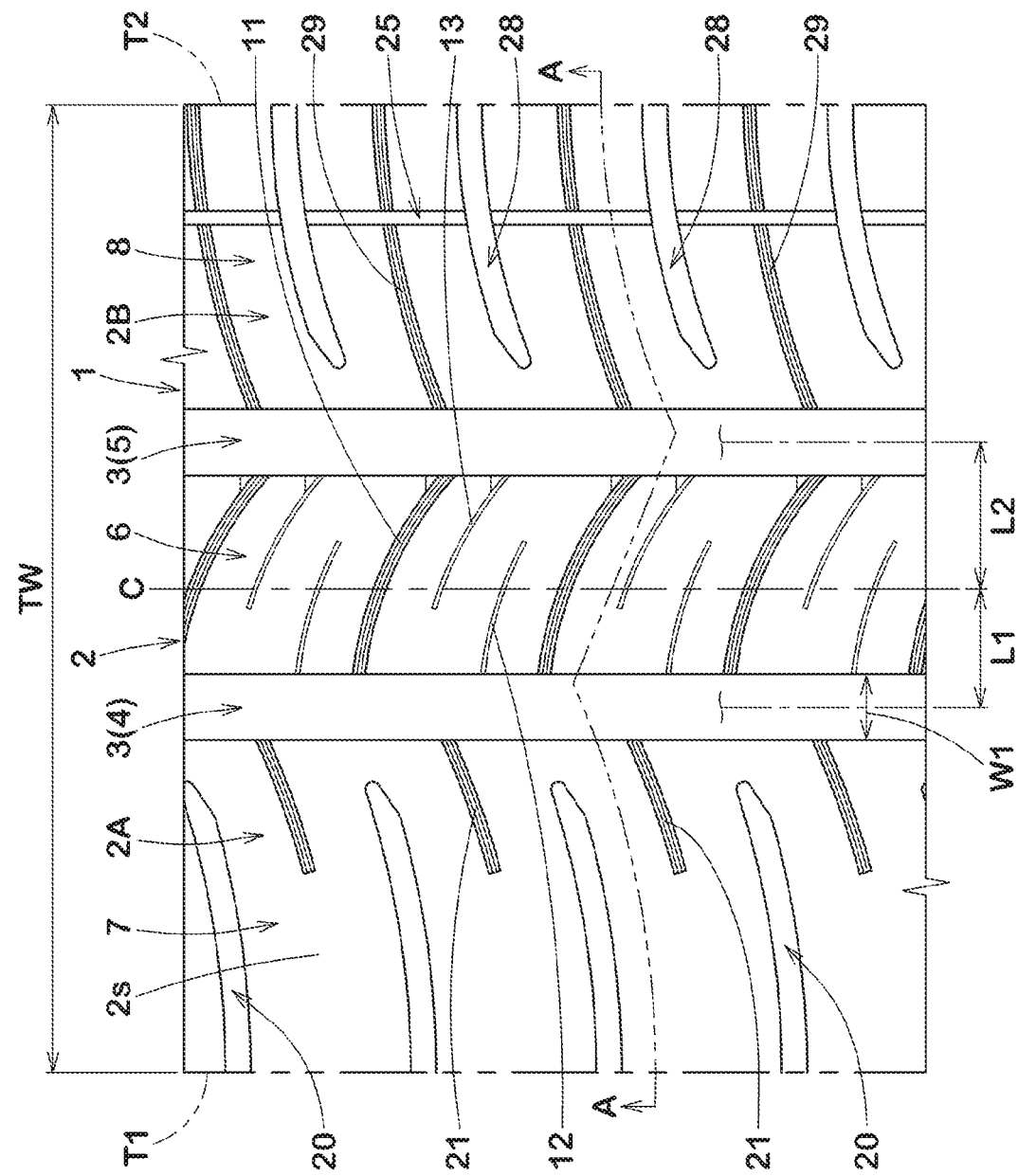
FIG. 2 is a development view of the tread portion of FIG. 1.

FIG. 1 is a lateral cross-sectional view of a tread portion 2 of a tyre 1 in this embodiment. FIG. 2 is a development view of the tread portion 2. FIG. 1 is the cross-sectional view taken along A-A line of FIG. 2. As shown in FIG. 1 and FIG. 2, the tyre 1 in this embodiment is configured as a pneumatic tyre for a passenger car, for example. However, the present invention is not limited to such an embodiment.

In the tyre 1 in this embodiment, the position thereof when mounted on a vehicle is specified, for example. The position when mounted on a vehicle is indicated by letters, figures, and the like on at least one of sidewall portions of the tyre 1, for example. When the tyre 1 is mounted on a vehicle, in FIG. 1, right side corresponds to an inner side of the vehicle and left side corresponds to an outer side of the vehicle.

By the mounting position on a vehicle being specified, when the tyre 1 is mounted on a vehicle, an outer tread edge T1 positioned on the outer side of the vehicle and an inner tread edge T2 positioned on the inner side of the vehicle are specified in the tread portion 2. Thereby, the tread portion 2 is provided with an outer tread portion 2A defined between a tyre equator (C) and the outer tread edge T1 and an inner tread portion 2B defined between the tyre equator (C) and the inner tread edge T2.

In a case of a pneumatic tyre, the outer tread edge T1 and the inner tread edge T2 are defined as outermost ground contacting positions in a tyre axial direction when the tyre 1 in a standard state is in contact with a flat surface with zero camber angle by being loaded with a standard tyre load. The standard state is a state in which the tyre is mounted on a standard rim, inflated to a standard inner pressure, and loaded with no tyre load. In this specification, dimensions and the like of various parts of the tyre are those measured under the standard state unless noted otherwise.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard tyre load" is a tyre load specified for the concerned tyre by a standard included in a standardization system on which the tyre is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The tread portion 2 is provided with a tread ground contacting surface (2s) and at least one main groove 3 (a pair of the main grooves 3 in this embodiment) having an opening at the tread ground contacting surface (2s) and extending continuously in a tyre circumferential direction.

The tread ground contacting surface (2s) is a surface area of the tread portion to be in contact with a flat surface when the tread portion 2 of the tyre in a reference state is placed on the flat surface. The reference state is a state in which the tyre is mounted on the standard rim, inflated to the standard inner pressure, and placed on a flat surface with zero camber angle by being loaded with the standard tyre load.

As shown in FIG. 2, each of the main grooves 3 extends continuously in the tyre circumferential direction with a relatively large groove width and depth in order to discharge water on a road surface to a rear side of the tyre. In a preferred embodiment, each of the main grooves 3 has the groove width and the depth each preferably of 5 mm or more, more preferably 6 mm or more. Further, a groove width W1 of each of the main grooves 3 at the tread ground contacting surface (2s) is in a range of from 5.0% to 9.0% of a tread width TW, for example. The depth of each of the main grooves 3 is in a range of from 5 to 12 mm, for example. Each of the main grooves in this embodiment extends linearly along the tyre circumferential direction, for example. In another embodiment, each of the main grooves may extend in a non-linear manner such as a zigzag manner and a wavy manner. The tread width TW is a distance in the tyre axial direction between the outer tread edge T1 and the inner tread edge T2 of the tyre 1 in the standard state.

The main grooves 3 include a first crown main groove 4 and a second crown main groove 5 arranged so as to sandwich the tyre equator (C). The first crown main groove 4 is arranged between the tyre equator (C) and the outer tread edge T1. The second crown main groove 5 is arranged between the tyre equator (C) and the inner tread edge T2.

It is preferred that a distance L1 in the tyre axial direction between the tyre equator (C) and a groove center line of the first crown main groove 4 and a distance L2 in the tyre axial direction between the tyre equator (C) and a groove center line of the second crown main groove 5 are each in a range of from 0.08 to 0.20 times the tread width TW, for example. Further, in this embodiment, the distance L1 is smaller than the distance L2.

Figure 3:
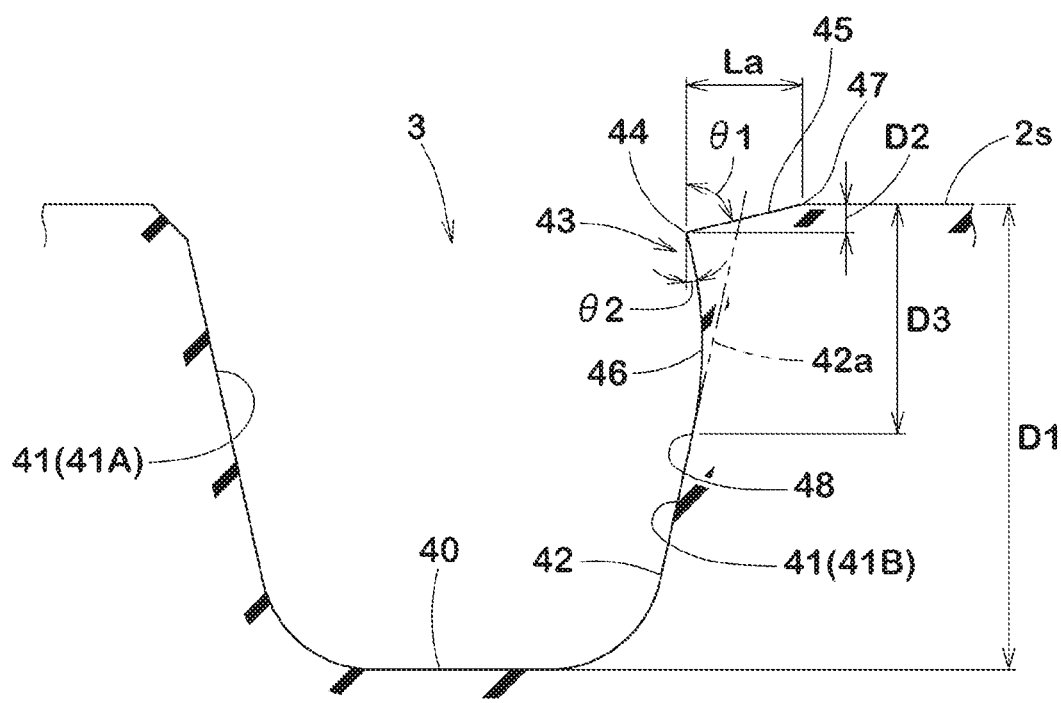
FIG. 3 is an enlarged cross-sectional view of one of the main grooves.

FIG. 3 is an enlarged cross-sectional view of one of the main grooves 3. FIG. 3 is a lateral cross-sectional view taken perpendicular to a length direction of the main groove 3. As shown in FIG. 3, each of the main grooves 3 has a bottom surface 40 and two groove wall surfaces 41 each extending continuously from the bottom surface 40 and outwardly in a tyre radial direction. At least one of the two groove wall surfaces 41 is provided with an inner groove wall portion 42 connected with the bottom surface 40 and a protruding portion 43 protruding inwardly in a groove width direction of the at least one of the main grooves 3.

The inner groove wall portion 42 is inclined outwardly in the groove width direction as it goes outwardly in the tyre radial direction from the bottom surface 40. An angle of the inner groove wall portion 42 with respect to a tread normal line is in a range of from 10 to 15 degrees, for example.

The protruding portion 43 is connected with the inner groove wall portion 42 on an outer side thereof in the tyre radial direction and has a protruding end 44 protruding inwardly in the groove width direction from a groove reference line (42a) obtained by extending the inner groove wall portion 42.

The protruding portion 43 has an inclined surface portion 45 which is inclined and extends so as to connect between the protruding end 44 and the tread ground contacting surface (2s). Thereby, the inclined surface portion 45 and the tread ground contacting surface (2s) are connected continuously via a boundary portion 47. It is preferred that an angle between the inclined surface portion 45 and the tread ground contacting surface (2s) is an obtuse angle of 160 degrees or more, for example. Further, the boundary portion 47 may be a curved surface, for example. Thereby, in the reference state, when a tyre load larger than the standard tyre load is applied to the tread portion 2, at least a part of the inclined surface portion 45 is in contact with the flat surface.

Further, in the reference state, when a tyre load of 1.20 times the standard tyre load is applied to the tread portion 2, the whole inclined surface portion 45 is in contact with the flat surface.

The inclined surface portion 45 configured as such comes into contact with the ground when ground contact pressure applied to the tread portion 2 is increased, therefore, the ground contact pressure applied to the boundary portion 47 between the tread ground contacting surface (2s) and the inclined surface portion 45 is prevented from increasing locally, thereby, it is possible that uneven wear in the vicinity of the boundary portion 47 is suppressed.

Further, the whole inclined surface portion 45 comes into contact with the ground when a tyre load of 1.20 times the standard tyre load is applied to the tread portion 2, for example, in a state in which the ground contact pressure applied to the tread portion 2 is increased like a tyre positioned on an outer side of cornering during cornering, a ground contacting area of the tread portion 2 is increased. Thereby, grip force during cornering is increased, therefore, excellent steering stability is exerted.

The two groove wall surfaces 41 of the at least one of the main grooves 3 consist of a first groove wall surface 41A positioned on a side of the outer tread edge T1 and a second groove wall surface 41B positioned on a side of the inner tread edge T2. In this embodiment, the second groove wall surface 41B has the protruding portion 43 and the first groove wall surface 41A does not have the protruding portion 43. Thereby, with respect to the main grooves 3, the uneven wear of one of edges on a side of the inner tread edge T2 where the uneven wear is likely to occur is effectively suppressed while drainage property is maintained.

In the reference state, when a tyre load of 1.10 times the standard tyre load is applied to the tread portion 2, it is preferred that in a range of from 40% to 60% of the inclined surface portion 45 comes into contact with the flat surface. The inclined surface portion 45 configured as such makes steering responsiveness linear, therefore, it is possible that excellent steering stability is exerted.

In order to ensure that the inclined surface portion 45 is in contact with the ground, it is preferred that the inclined surface portion 45 is inclined at an angle θ1 in a range of from 70 to 80 degrees with respect to a tread normal line passing through the protruding end 44.

From a similar point of view, it is preferred that a length (La) in the tyre axial direction of the inclined surface portion 45 is in a range of from 0.05 to 0.25 times the groove width W1 (shown in FIG. 2) of each of the main grooves 3, for example. Specifically, it is preferred that the length (La) of the inclined surface portion 45 is in a range of from 1.5 to 2.5 mm, for example. It is possible that the inclined surface portion 45 configured as such exerts excellent steering stability while securing the drainage property of the main grooves 3.

From a similar point of view, it is preferred that a depth D2 of the protruding end 44 is in a range of from 0.3 to 0.7 mm, for example.

The protruding portion 43 has a protruding groove wall portion 46 extending so as to connect between the inner groove wall portion 42 and the protruding end 44. The protruding groove wall portion 46 includes a portion which is inclined inwardly in the groove width direction as it goes outwardly in the tyre radial direction. An angle θ2 of the protruding groove wall portion 46 with respect to the tread normal line passing through the protruding end 44 is in a range of from 10 to 20 degrees, for example.

A depth D3 of a boundary 48 between the inner groove wall portion 42 and the protruding groove wall portion 46 is in a range of from 0.25 to 0.75 times, preferably in a range of from 0.35 to 0.50 times, a depth D1 of each of the main grooves 3, for example. Thereby, groove volume of the main grooves 3 is secured, therefore, the wet performance and the steering stability are improved in a good balance.

As shown in FIG. 2, the tread portion 2 has a crown land region 6, an outer shoulder land region 7, and an inner shoulder land region 8 divided by the main grooves 3. The crown land region 6 is defined between the first crown main groove 4 and the second crown main groove 5. The outer shoulder land region 7 is defined between the first crown main groove 4 and the outer tread edge T1. The inner shoulder land region 8 is defined between the second crown main groove 5 and the inner tread edge T2.

Figure 4:
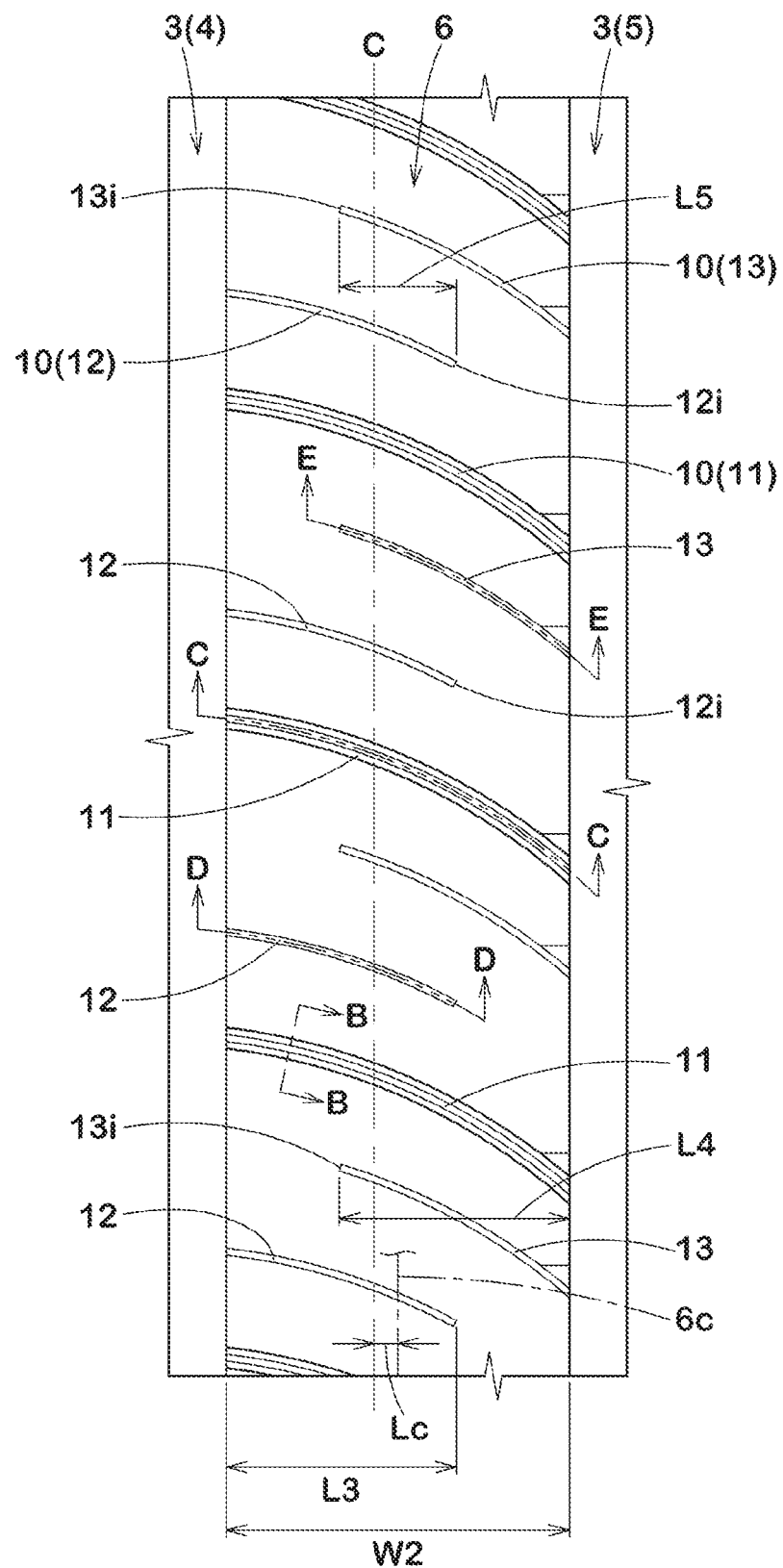
FIG. 4 is an enlarged view of a crown land region of FIG. 2.

FIG. 4 is an enlarged view of the crown land region 6. As shown in FIG. 4, it is preferred that a width W2 of the crown land region 6 is in a range of from 0.15 to 0.25 times the tread width TW (shown in FIG. 2 and the same applies hereinafter), for example. Further, a center in the tyre axial direction of the crown land region 6 is positioned on a side of the second crown main groove 5 of the tyre equator (C). Thereby, in this embodiment, the width of the crown land region 6 included in the inner tread portion 2B is large, therefore, excellent steering stability is exerted.

It is preferred that a displacement amount (Lc) of the center of the crown land region 6 is in a range of from 0.05 to 0.10 times a width W2 in the tyre axial direction of the crown land region 6, for example. Note that the displacement amount (Lc) is a distance in the tyre axial direction between the tyre equator (C) and a center (6c) in the tyre axial direction of the crown land region 6.

The crown land region 6 is provided with a plurality of crown sipes 10. Note that in this specification, the "sipe" is defined as a narrow incision having a main body portion having a width of less than 2.0 mm. The width of the main body portion of the sipe is preferably less than 1.5 mm, more preferably in a range of from 0.4 to 1.0 mm. The sipe may have an opening width at a ground contacting surface in a range of from 1.5 to 2.5 mm, for example.

The crown sipes 10 include first crown sipes 11, second crown sipes 12, and third crown sipes 13. Each of the first crown sipes 11 extends so as to connect between the first crown main groove 4 and the second crown main groove 5. Each of the second crown sipes 12 extends from the first crown main groove 4 to terminate within the crown land region 6. Each of the third crown sipes 13 extends from the second crown main groove 5 to terminate within the crown land region 6.

Each of the crown sipes 10 configured as such moderates rigidity of the crown land region 6 moderately, therefore, it is possible that ride comfort is improved while the steering stability is maintained. Further, each of the crown sipes 10 makes rigidity distribution of the crown land region 6 uniform, therefore, it is helpful for suppressing the uneven wear of the crown land region 6.

In each of the second crown sipes 12 and the third crown sipes 13 which terminates within the crown land region 6, a portion on a side of an outer end connected with a respective one of the crown main grooves is relatively easy to open and a portion on a side of an inner end terminating within the crown land region 6 is relatively difficult to open. Thereby, in the crown land region 6 which is provided with the second crown sipes 12 and the third crown sipes 13, torsional deformation is likely to occur in the ground contacting surface. In particular, in the present invention, the center in the tyre axial direction of the crown land region 6 is positioned on a side of the second crown main groove 5 of the tyre equator (C), therefore, the torsional deformation is more likely to occur in the ground contacting surface of the crown land region 6 due to a change in the ground contact pressure. Thereby, when a slip angle is given to the tyre of the present invention, the ground contacting surface of the crown land region 6 follows a road surface to generate the torsional deformation quickly, therefore, cornering force is consequently generated without delay. Thereby, the tyre of the present invention has high initial responsiveness during cornering, therefore, excellent steering stability is exerted.

It is preferred that each of the first crown sipes 11 is curved so as to be convex toward one side in the tyre circumferential direction, for example. A radius of curvature of each of the first crown sipes 11 is in a range of from 45 to 65 mm, for example. Further, an angle of each of the first crown sipes 11 in this embodiment with respect to the tyre axial direction is decreased as it goes from the first crown main groove 4 to the second crown main groove 5. It is preferred that an angle of each of the first crown sipes 11 with respect to the tyre axial direction is in a range of from 5 to 30 degrees, for example. It is possible that the first crown sipes 11 configured as such provide frictional force in multiple directions by edges thereof.

Figure 5A:
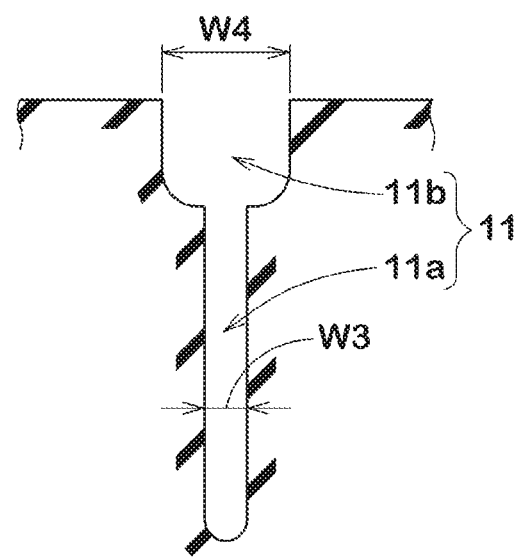
FIG. 5A is a cross-sectional view taken along B-B line of FIG. 4.

FIG. 5A is a cross-sectional view of one of the first crown sipes 11 taken along B-B line of FIG. 4. FIG. 5A is a lateral cross-sectional view taken perpendicular to a length direction of the first crown sipe 11. As shown in FIG. 5A, each of the first crown sipes 11 includes a main body portion (11a) and a wide width portion (11b) arranged on the outer side in the tyre radial direction of the main body portion (11a) and having a width larger than that of the main body portion (11a). It is preferred that a width W3 of the main body portion (11a) is in a range of from 0.4 to 0.8 mm, for example. It is preferred that a width W4 of the wide width portion (11b) is in a range of from 1.0 to 2.0 mm, for example. It is more preferred that the width W4 of the wide width portion (11b) is in a range of from 1.5 to 4.0 times the width W3 of the main body portion (11a). The first crown sipes 11 configured as such sufficiently moderate the rigidity of the crown land region 6, therefore, it is possible that excellent ride comfort is exerted.

Figure 5B:
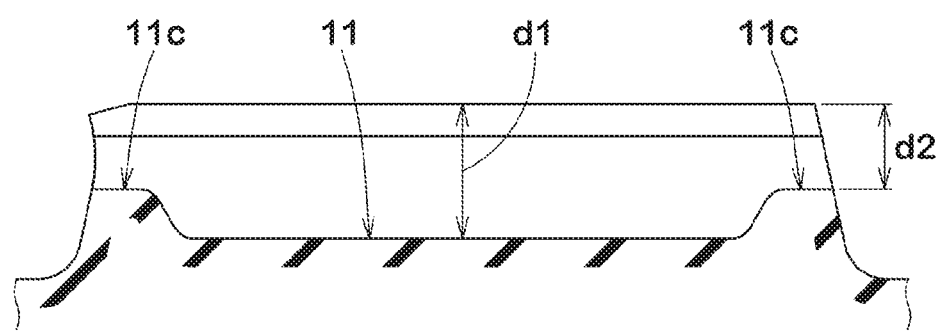
FIG. 5B is a cross-sectional view taken along C-c line of FIG. 4.

FIG. 5B is a cross-sectional view of one of the first crown sipes 11 taken along c-c line of FIG. 4. As shown in FIG. 5B, each of the first crown sipes 11 has a shallow bottom portion (11c) having a depth smaller than a maximum depth of the each of the first crown sipes 11. Each of the first crown sipes 11 in this embodiment has the shallow bottom portions (11c) at both end portions thereof in the tyre axial direction, for example. In the first crown sipes 11 configured as such, excessive opening can be prevented when the ground contact pressure is applied to the crown land region 6, therefore, it is possible that excellent steering stability and excellent uneven wear resistance performance are exerted.

A maximum depth (d1) of each of the first crown sipes 11 is in a range of from 0.60 to 1.00 times the depth of each of the main grooves 3, for example. A depth (d2) of the shallow bottom portion (11c) of each of the first crown sipes 11 is in a range of from 0.40 to 0.85 times the maximum depth (d1), for example.

As shown in FIG. 4, a pair of the second crown sipe 12 and the third crown sipe 13 is arranged between each pair of the first crown sipes 11 adjacent to each other in the tyre circumferential direction. A length L3 in the tyre axial direction of each of the second crown sipes 12 and a length L4 in the tyre axial direction of each of the third crown sipes 13 are each in a range of from 0.50 to 0.80 times the width W2 of the crown land region 6, for example.

Each of the second crown sipes 12 and the third crown sipes 13 has an inner end terminating within the crown land region 6. An inner end (13i) of each of the third crown sipes 13 in this embodiment is positioned on a side of the first crown main groove 4 of an inner end (12i) of each of the second crown sipes 12. A sipe overlapping length L5 which is a distance in the tyre axial direction between the inner end (12i) of each of the second crown sipes 12 and the inner end (13i) of each of the third crown sipes 13 is preferably 0.25 or more times, more preferably 0.30 or more times, and preferably 0.45 times or less, more preferably 0.40 or less times the width W2 of the crown land region 6, for example. Such an arrangement of the second crown sipes 12 and the second crown sipes 12 makes it easy for the torsional deformation to occur in the crown land region 6, therefore, it is helpful for improving the initial responsiveness.

Each of the second crown sipes 12 and the third crown sipes 13 is curved so as to be convex in the same direction as each of the first crown sipes 11. Thereby, an angle with respect to the tyre axial direction each of the second crown sipes 12 and the third crown sipes 13 is gradually increased as it goes from the side of the first crown main groove 4 to the side of the second crown main groove 5. It is preferred that the angle and a radius of curvature of each of the second crown sipes 12 and the third crown sipes 13 with respect to the tyre axial direction are in the same ranges as those of the first crown sipes 11.

It is preferred that each of the second crown sipes 12 and the third crown sipes 13 extends between a bottom portion thereof and the ground contacting surface of the land region with a width in a range of from 0.4 to 0.8 mm, for example. Thereby, at an outer surface of the tread portion 2, an opening width of each of the first crown sipes 11 is larger than an opening width of each of the second crown sipes 12 and an opening width of each of the third crown sipes 13. Thereby, the uneven wear resistance performance in the vicinity of the second crown sipes 12 and the third crown sipes 13 is improved.

Figure 6A:
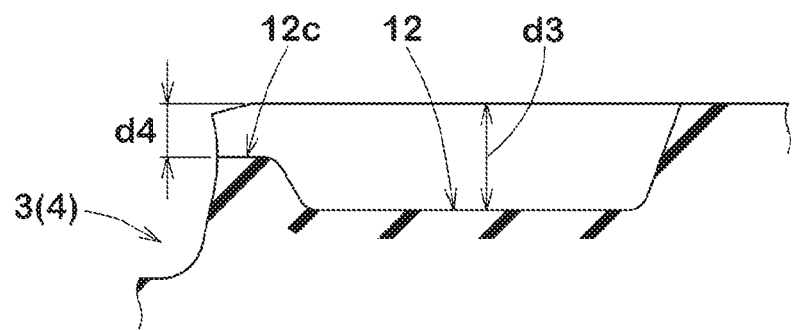
FIG. 6A is a cross-sectional view taken along D-D line of FIG. 4.
Figure 6B:
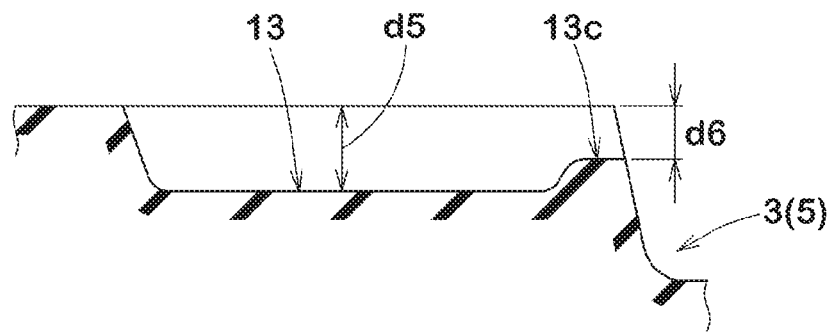
FIG. 6B is a cross-sectional view taken along E-E line of FIG. 4.

FIG. 6A is a cross-sectional view of one of the second crown sipes 12 taken along D-D line of FIG. 4. FIG. 6B is a cross-sectional view of one of the third crown sipes 13 taken along E-E line of FIG. 4. As shown in FIG. 6A and FIG. 6B, it is preferred that a maximum depth (d3) of each of the second crown sipes 12 and a maximum depth (d5) of each of the third crown sipes 13 are each smaller than the maximum depth (d1) of each of the first crown sipes 11, and specifically, they are each in a range of from 0.40 to 0.90 times the maximum depth (d1). The second crown sipes 12 and the third crown sipes 13 configured as such suppress excessive decrease in the rigidity of the crown land region 6, therefore, they are helpful for improving the steering stability.

It is preferred that the maximum depth (d3) of each of the second crown sipes 12 is larger than the maximum depth (d5) of each of the third crown sipes 13.

In order to further improve the initial responsiveness, it is preferred that the maximum depth (d5) of each of the third crown sipes 13 is larger than the depth (d2) of the shallow bottom portion (11c) of each of the first crown sipes 11.

It is preferred that each of the second crown sipes 12 has a shallow bottom portion (12c) having a depth smaller than the maximum depth of the each of the second crown sipes 12. Similarly, it is preferred that each of the third crown sipes 13 has a shallow bottom portion (13c) having a depth smaller than the maximum depth of the each of the third crown sipes 13. Each of the shallow bottom portions (12c) and (13c) in this embodiment is arranged at an end portion of a respective one of the crown sipes on a side of a respective one of the main grooves 3. The shallow bottom portions (12c) and (13c) configured as such suppress excessive opening of the sipes, therefore, they are helpful for improving the steering stability.

A depth (d4) of the shallow bottom portion (12c) of each of the second crown sipes 12 and a depth (d6) of the shallow bottom portion (13c) of each of the third crown sipes 13 are each in a range of from 0.15 to 0.30 times the depth of each of the main grooves, for example. In a preferred embodiment, the depth (d4) of the shallow bottom portion (12c) of each of the second crown sipes 12 and the depth (d6) of the shallow bottom portion (13c) of each of the third crown sipes 13 are each smaller than the depth (d2) of the shallow bottom portion (11c) of each of the first crown sipes 11. Thereby, the rigidity in the vicinity of the second crown sipes 12 and the third crown sipes 13 is increased, therefore, the uneven wear resistance performance is improved.

Figure 7:
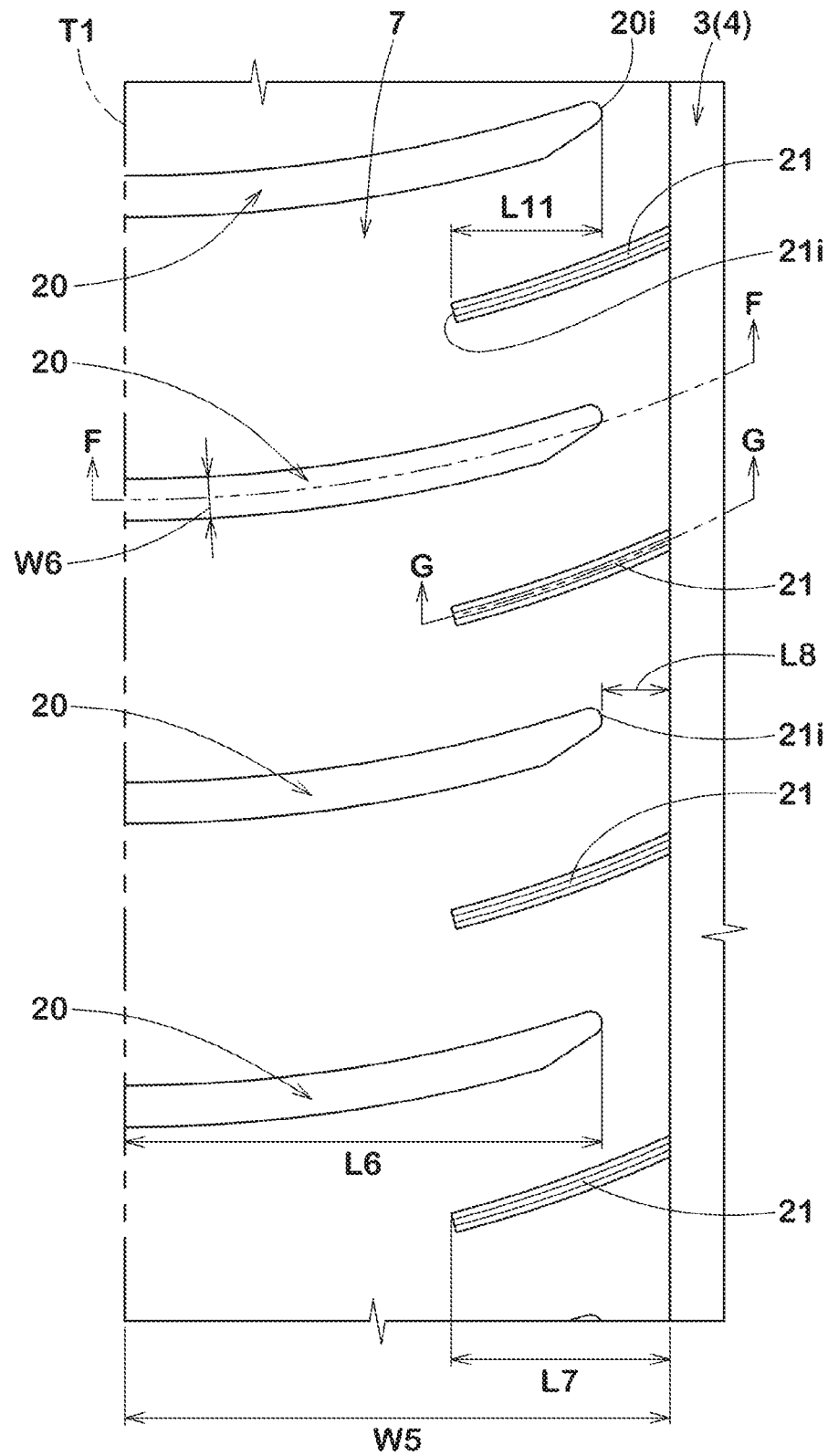
FIG. 7 is an enlarged view of an outer shoulder land region of FIG. 2.

FIG. 7 is an enlarged view of the outer shoulder land region 7. As shown in FIG. 7, the outer shoulder land region 7 has a width in the tyre axial direction larger than those of the crown land region 6 and the inner shoulder land region 8. It is possible that the outer shoulder land region 7 configured as such has high rigidity and improves the steering stability while exerting excellent uneven wear resistance performance. It is preferred that a width W5 in the tyre axial direction of the outer shoulder land region 7 is in a range of from 0.30 to 0.45 times the tread width TW, for example.

The outer shoulder land region 7 is provided with outer shoulder lateral grooves 20 and outer shoulder sipes 21. Each of the outer shoulder lateral grooves 20 extends from the outer tread edge T1 to terminate within the outer shoulder land region 7. Each of the outer shoulder sipes 21 extends from the first crown main groove 4 to terminate within the outer shoulder land region 7.

In the outer shoulder land region 7 which is provided with the outer shoulder lateral grooves 20 and the outer shoulder sipes 21, the torsional deformation is likely to occur in the ground contacting surface, therefore, it is possible that the initial responsiveness during cornering is consequently improved.

Each of the outer shoulder lateral grooves 20 and the outer shoulder sipes 21 has a terminating end terminating within the outer shoulder land region 7. A terminating end (21i) of each of the outer shoulder sipes 21 in this embodiment is positioned on the outer side in the tyre axial direction of a terminating end (20i) of each of the outer shoulder lateral grooves 20. Thereby, the torsional deformation is likely to occur in the outer shoulder land region 7, therefore, it is possible that the initial responsiveness is further improved.

A distance L11 in the tyre axial direction between the terminating end (20i) of each of the outer shoulder lateral grooves 20 and the terminating end (21i) of each of the outer shoulder sipes 21 is in a range of from 0.20 to 0.35 times the width W5 in the tyre axial direction of the outer shoulder land region 7, for example. Thereby, excellent initial responsiveness is exerted while the ride comfort is maintained.

Each of the outer shoulder lateral grooves 20 is smoothly curved, for example. It is preferred that an angle with respect to the tyre axial direction of each of the outer shoulder lateral grooves 20 is gradually increased as it goes from the outer tread edge T1 toward the first crown main groove 4, for example. It is preferred that the angle of each of the outer shoulder lateral grooves 20 with respect to the tyre axial direction is in a range of from 0 to 20 degrees, for example.

It is preferred that a length L6 in the tyre axial direction of each of the outer shoulder lateral grooves 20 is in a range of from 0.70 to 0.92 times the width W5 in the tyre axial direction of the outer shoulder land region 7, for example. Further, it is preferred that a groove width W6 of each of the outer shoulder lateral grooves 20 is in a range of from 0.25 to 0.45 times the groove width W1 of each of the main grooves 3.

Figure 8:
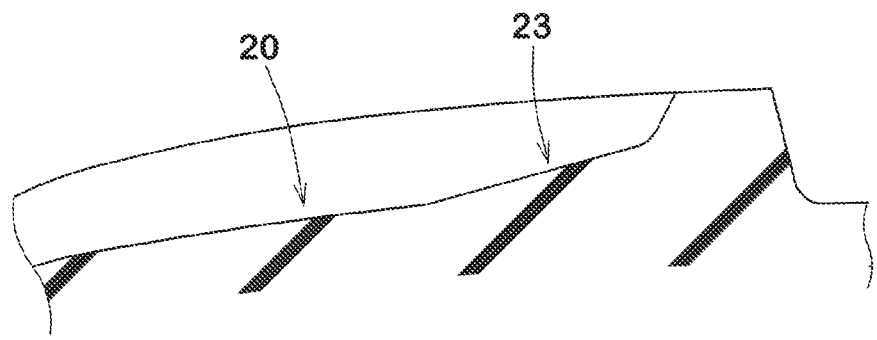
FIG. 8 is a cross-sectional view taken along F-F line of FIG. 7.

FIG. 8 is a cross-sectional view of one of the outer shoulder lateral grooves 20 taken along F-F line of FIG. 7. As shown in FIG. 8, each of the outer shoulder lateral grooves 20 includes an inner portion 23 arranged on a side of the first crown main groove 4 of the terminating end (21i) (shown in FIG. 7) of each of the outer shoulder sipes 21. It is preferred that the inner portion 23 has a depth gradually decreasing axially inwardly, for example. It is possible that the outer shoulder lateral grooves 20 having the inner portions 23 configured as such improve the ride comfort and the steering stability in a good balance.

As shown in FIG. 7, each of the outer shoulder sipes 21 is curved so as to be convex toward the same direction as the outer shoulder lateral grooves 20, for example. It is preferred that an angle of each of the outer shoulder sipes 21 with respect to the tyre axial direction is in the same range as that of the outer shoulder lateral grooves 20. It is preferred that a radius of curvature of each of the outer shoulder sipes 21 is in a range of from 100 to 150 mm, for example. In a preferred embodiment, it is preferred that the radius of curvature of each of the outer shoulder sipes 21 is larger than the radius of curvature of each of the first crown sipes 11.

It is preferred that a length L7 in the tyre axial direction of each of the outer shoulder sipes 21 is in a range of from 0.30 to 0.70 times a width W5 in the tyre axial direction of the outer shoulder land region 7, for example.

It is preferred that each of the outer shoulder sipes 21, in a lateral cross section taken perpendicular to a length direction thereof, has a similar cross-sectional shape as each of the first crown sipes 11. That is, each of the outer shoulder sipes 21 has the main body portion (not shown) and the wide width portion (not shown) arranged on the outer side in the tyre radial direction of the main body portion and having a width larger than that of the main body portion. The outer shoulder sipes 21 configured as such are helpful for improving the ride comfort.

Figure 9:
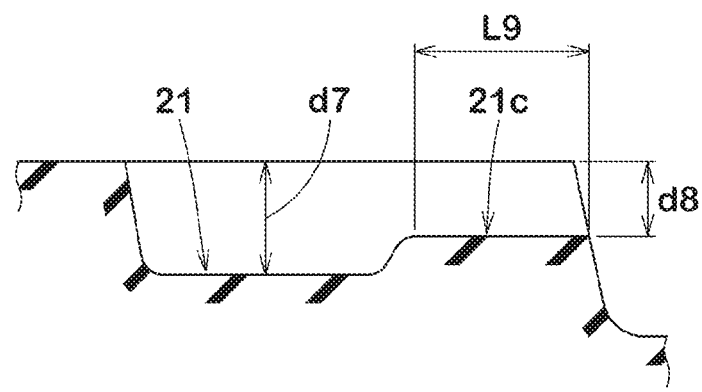
FIG. 9 is a cross-sectional view taken along G-G line of FIG. 7.

FIG. 9 is a cross-sectional view of one of the outer shoulder sipes 21 taken along G-G line of FIG. 7. As shown in FIG. 9, each of the outer shoulder sipes 21 has a shallow bottom portion (21c) having a depth larger than a maximum depth of the each of the outer shoulder sipes 21. The shallow bottom portion (21c) in this embodiment is arranged at an inner end in the tyre axial direction of each of the outer shoulder sipes 21, for example. The shallow bottom portions (21c) configured as such suppress excessive opening of the sipes, therefore, they are helpful for improving the steering stability.

It is preferred that a depth (d8) of the shallow bottom portion (21c) is in a range of from 0.15 to 0.50 times the depth of each of the main grooves 3. Further, it is preferred that the depth (d8) of the shallow bottom portion (21c) is in a range of from 0.60 to 0.75 times a maximum depth (d7) of each of the outer shoulder sipes 21, for example.

It is preferred that a length L9 in the tyre axial direction of the shallow bottom portion (21c) is larger than a distance L8 (shown n FIG. 7) in the tyre axial direction between a closer one of groove edges of the first crown main groove 4 and the terminating end (20i) of each of the outer shoulder lateral grooves 20, for example. The shallow bottom portions (21c) configured as such sufficiently suppress excessive opening of the outer shoulder sipes 21, therefore, it is possible that the steering stability and the uneven wear resistance performance are improved.

Figure 10:
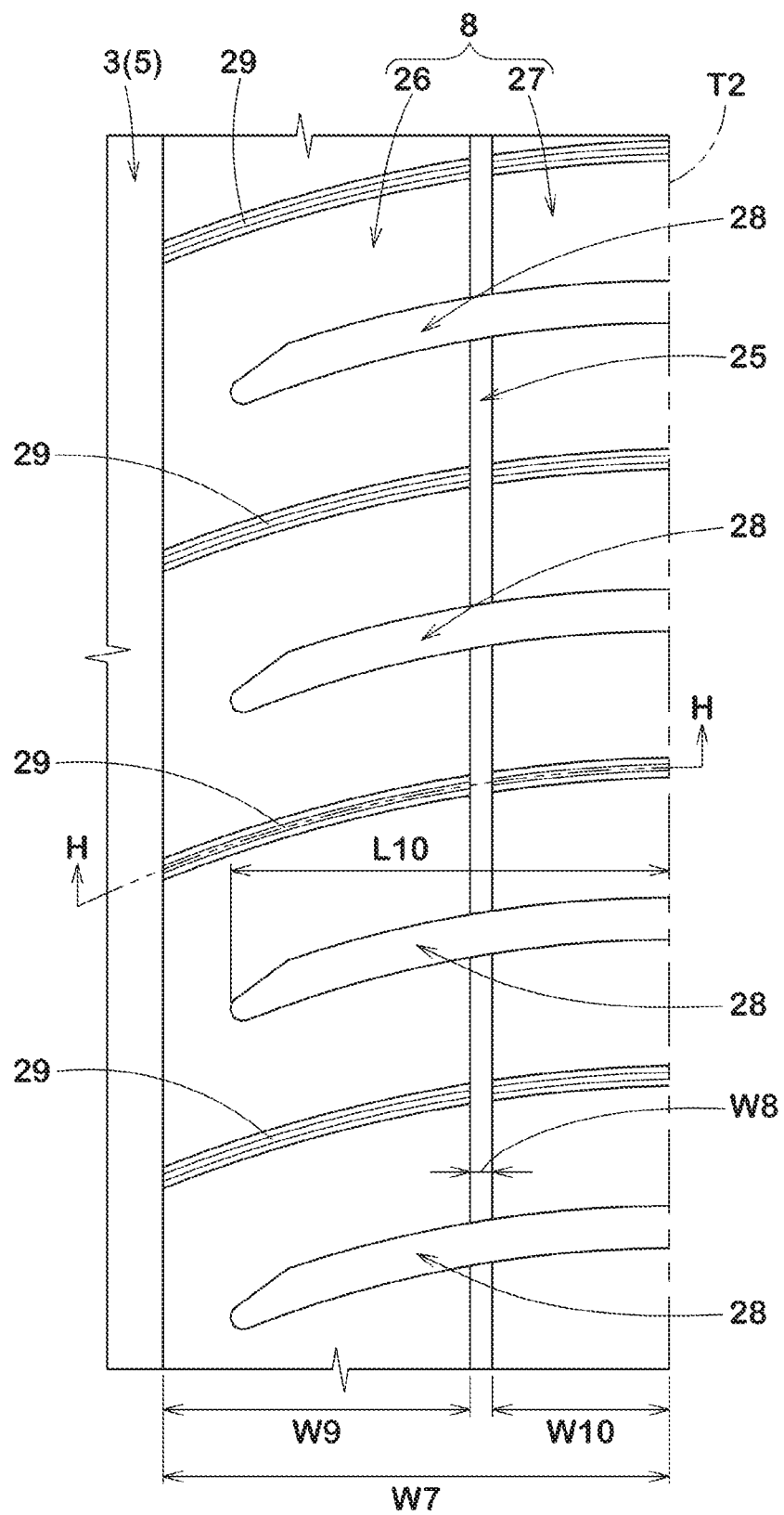
FIG. 10 is an enlarged view of an inner shoulder land region of FIG. 2.

FIG. 10 is an enlarged view of the inner shoulder land region 8. As shown in FIG. 10, it is preferred that a width W7 in the tyre axial direction of the inner shoulder land region 8 is in a range of from 0.25 to 0.35 times the tread width TW, for example.

The inner shoulder land region 8 is provided with a longitudinal narrow groove 25. The longitudinal narrow groove 25 has a groove width and a groove depth each of less than 5 mm and is distinguished from the main grooves described above. A groove width W8 of the longitudinal narrow groove 25 in this embodiment is in a range of from 0.20 to 0.30 times the groove width W1 of each of the main grooves 3, for example. The inner shoulder land region 8 includes a first portion 26 defined between the second crown main groove 5 and the longitudinal narrow groove 25 and a second portion 27 defined between the longitudinal narrow groove 25 and the inner tread edge T2.

It is preferred that a width W9 in the tyre axial direction of the first portion 26 is in a range of from 0.55 to 0.65 times a width W7 of the inner shoulder land region 8, for example. It is preferred that a width W10 in the tyre axial direction of the second portion 27 is in a range of from 0.30 to 0.40 times the width W7 of the inner shoulder land region 8, for example.

The inner shoulder land region 8 is provided with inner shoulder lateral grooves 28 and inner shoulder sipes 29. Each of the inner shoulder lateral grooves 28 extends from the inner tread edge T2 to terminate within the inner shoulder land region 8. Each of the outer shoulder sipes 21 extends so as to connect between the second crown main groove 5 and the inner tread edge T2.

Each of the inner shoulder lateral grooves 28 extends so as to cross the longitudinal narrow groove 25 to terminate within the first portion 26 of the inner shoulder land region 8, for example. It is preferred that a length L10 in the tyre axial direction of the inner shoulder lateral grooves 28 is in a range of from 0.80 to 0.90 times the width W7 in the tyre axial direction of the inner shoulder land region 8, for example.

It is preferred that each of the inner shoulder lateral grooves 28 has a depth gradually decreasing axially inwardly between the longitudinal narrow groove 25 and the second crown main groove 5, for example. The inner shoulder lateral grooves 28 configured as such are helpful for improving the ride comfort and the steering stability in a good balance.

Each of the inner shoulder sipes 29 is curved so as to be convex toward one side in the tyre circumferential direction, for example. It is preferred that a radius of curvature of each of the inner shoulder sipes 29 is larger than the radius of curvature of each of the first crown sipes 11, for example. Specifically, the radius of curvature of each of the inner shoulder sipes 29 is in a range of from 120 to 150 mm.

It is preferred that each of the inner shoulder sipes 29, in a lateral cross section perpendicular to a length direction thereof, has a similar cross-sectional shape as that of each of the first crown sipes 11. That is, each of the inner shoulder sipes 29 includes the main body portion (not shown) and the wide width portion (not shown) arranged on the outer side in the tyre radial direction of the main body portion and having a width larger than that of the main body portion. The inner shoulder sipes 29 configured as such are helpful for improving the ride comfort.

Figure 11:
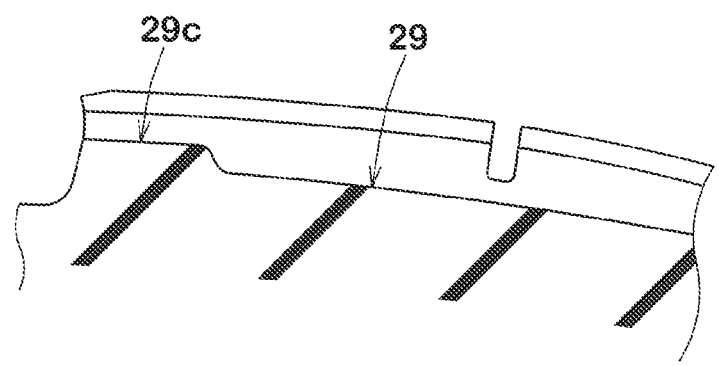
FIG. 11 is a cross-sectional view taken along H-H line of FIG. 10.

FIG. 11 is a cross-sectional view of one of the inner shoulder sipes 29 taken along H-H line of FIG. 10. As shown in FIG. 11, each of the inner shoulder sipes 29 has a shallow bottom portion (29c) having a depth smaller than a maximum depth of the each of the inner shoulder sipes 29. The shallow bottom portion (29c) in this embodiment is arranged at an inner end portion in the tyre axial direction of each of the inner shoulder sipes 29, for example. The shallow bottom portions (29c) suppress excessive opening of the inner shoulder sipes 29, therefore, they are helpful for improving the steering stability and the uneven wear resistance performance.

A width in the tyre axial direction of the shallow bottom portion (29c) arranged in each of the inner shoulder sipes 29 in this embodiment is larger than the width of the shallow bottom portion of each of the crown sipes 10. The inner shoulder sipes 29 configured as such are helpful for suppressing the uneven wear of the inner shoulder land region 8.

As shown in FIG. 2, it is preferred that a land ratio of the outer tread portion 2A is larger than a land ratio of the inner tread portion 2B. Thereby, it is possible that the outer tread portion 2A exerts large cornering force, therefore, excellent steering stability is exerted. Note that in this specification, the term "land ratio" means a ratio (Sb/Sa) between a total area (Sa) of an imaginary ground contacting surface obtained by filling all the grooves and the sipes and an actual total ground contacting area (Sb).

While detailed description has been made of an embodiment of the present invention, the present invention can be embodied in various forms without being limited to the illustrated embodiment.

Working Examples (Examples)

Pneumatic tyres of size 195/65R15 having the basic tread pattern shown in FIG. 1 were made by way of test according to the specification listed in Table 1. As Reference, tyres in which the main grooves were not provided with the protruding portions described above were made by way of test. The pattern of the tyres as the reference is identical to the one shown in FIG. 1 except for the configuration described above. Each of the test tyres was tested for the steering stability and the uneven wear resistance performance. Common specifications of the test tyres and the test methods were as follows.

Tyre rim: 15×6.0

Tyre inner pressure: 200 kPa

Test vehicle: front wheel drive car with a displacement of 2000 cc

Tyre mounting position: all wheels

<Steering Stability>

While the driver drove the test vehicle described above, the steering stability (including the initial responsiveness during cornering) was evaluated by the driver's feeling. The test results are indicated as an evaluation point based on the Reference being 100 wherein the larger the numerical value, the better the steering stability is.

<Uneven Wear Resistance Performance>

Wear energy applied to the groove edges of the main grooves was measured by using a wear energy measuring device. The test results are indicated by an index based on the wear energy of the Reference being 100, wherein the smaller the numerical value, the smaller the wear energy is, which shows more excellent uneven wear resistance performance.

The test results are shown in Table 1.

TABLE 1

|  | Ref. | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Presence (P) or absence (A) of Protruding portion | A | P | P | P | P | P | P | P | P | P |
| Angle θ1 of Inclined surface portion | — | 77 | 70 | 75 | 80 | 85 | 77 | 77 | 77 | 77 |
| Length (La) of Inclined surface portion/ Groove width w1 of Main groove | — | 0.18 | 0.18 | 0.18 | 0.18 | 0.18 | 0.05 | 0.10 | 0.20 | 0.25 |
| Steering stability [evaluation point] | 100 | 105 | 106 | 105 | 105 | 104 | 103 | 104 | 105 | 105 |
| Uneven wear resistance performance [index] | 100 | 97 | 98 | 97 | 97 | 96 | 98 | 97 | 97 | 96 |

From the test results, it was confirmed that the tyres as Examples exerted excellent steering stability and excellent uneven wear resistance performance.

The invention claimed is:

1. A tyre comprising a tread portion, wherein
the tread portion is provided with a tread ground contacting surface and at least one main groove having an opening at the tread ground contacting surface and extending continuously in a tyre circumferential direction,
in a reference state in which the tyre is mounted on a standard rim, inflated to a standard inner pressure, and placed on a flat surface with zero camber angle, when the tread portion of the tyre is loaded with a standard tyre load, the tread ground contacting surface is in contact with the flat surface,
the at least one main groove has a bottom surface and two groove wall surfaces extending outwardly in a tyre radial direction from the bottom surface,
in a lateral cross section taken perpendicular to a length direction of the at least one main groove, at least one of the two groove wall surfaces is provided with an inner groove wall portion connected with the bottom surface and a protruding portion connected with the inner groove wall portion and having a protruding end protruding inwardly in a groove width direction from a groove reference line obtained by extending the inner groove wall portion,
the protruding portion has an inclined surface portion which is inclined and extends between the protruding end and the tread ground contacting surface,
in the reference state, when a tyre load of 1.20 times the standard tyre load is applied to the tread portion, the whole inclined surface portion is in contact with the flat surface,
a position of the tyre when mounted on a vehicle is specified and when the tyre is mounted on a vehicle, the tread portion has an inner tread edge positioned on an inner side of the vehicle and an outer tread edge positioned on an outer side of the vehicle,
the two groove wall surfaces consist of a first groove wall surface positioned on a side of the outer tread edge and a second groove wall surface positioned on a side of the inner tread edge,
the second groove wall surface is provided with the protruding portion, and
the first groove wall surface is not provided with the protruding portion.

2. The tyre according to claim 1, wherein
in the reference state, when a tyre load larger than the standard tyre load is applied to the tread portion, at least a part of the inclined surface portion is in contact with the flat surface.

3. The tyre according to claim 1, wherein
the protruding portion has a protruding groove wall portion extending between the inner groove wall portion and the protruding end, and
the protruding groove wall portion includes a portion which is inclined inwardly in the groove width direction as it goes outwardly in the tyre radial direction.

4. The tyre according to claim 1, wherein
the inner groove wall portion is inclined outwardly in the groove width direction as it goes outwardly in the tyre radial direction.

5. The tyre according to claim 1, wherein
the inclined surface portion is inclined at an angle in a range of from 70 to 80 degrees with respect to a tread normal line passing through the protruding end.

6. The tyre according to claim 1, wherein
the tread portion is provided with an inner tread portion defined between a tyre equator and the inner tread edge and an outer tread portion defined between the tyre equator and the outer tread edge, and
a land ratio of the outer tread portion is larger than a land ratio of the inner tread portion.

7. The tyre according to claim 4, wherein
an angle of the inner groove wall portion with respect to a tread normal line is in a range of from 10 to 15 degrees.

8. The tyre according to claim 1, wherein
an angle between the inclined surface portion and the tread ground contacting surface is an obtuse angle of 160 degrees or more.

9. The tyre according to claim 1, wherein
in the reference state, when the tread portion is loaded with a tyre load of 1.10 times the standard tyre load, in a range of from 40% to 60% of the inclined surface portion comes into contact with the flat surface.

10. The tyre according to claim 1, wherein
a length in a tyre axial direction of the inclined surface portion is in a range of from 0.05 to 0.25 times a groove width of the at least one main groove.

11. The tyre according to claim 10, wherein
the length of the inclined surface portion is in a range of from 1.5 to 2.5 mm.

12. The tyre according to claim 1, wherein
a depth of the protruding end is in a range of from 0.3 to 0.7 mm.

13. The tyre according to claim 3, wherein an angle of the protruding groove wall portion with respect to a tread normal line passing through the protruding end is in a range of from 10 to 20 degrees.

14. The tyre according to claim 3, wherein a depth of a boundary between the inner groove wall portion and the protruding groove wall portion is in a range of from 0.25 to 0.75 times a depth of the at least one main groove.

15. The tyre according to claim 1, wherein the tread portion is provided with a pair of the main grooves sandwiching a tyre equator, and a crown land region defined between the main grooves, and a width of the crown land region is in a range of from 0.15 to 0.25 times a tread width.

16. The tyre according to claim 15, wherein a displacement amount in a tyre axial direction of a center of the crown land region from the tyre equator is in a range of from 0.05 to 0.10 times a width in the tyre axial direction of the crown land region.

17. The tyre according to claim 15, wherein the crown land region is provided with first crown sipes, second crown sipes, and third crown sipes, each of the first crown sipes extends so as to connect between the main grooves, each of the second crown sipes extends from the main groove on one side to terminate within the crown land region, and each of the third crown sipes extends from the main groove on the other side to terminate within the crown land region.

18. The tyre according to claim 17, wherein a pair of the second crown sipe and the third crown sipe is arranged between each pair of the first crown sipes adjacent to each other in the tyre circumferential direction.

19. A tyre comprising a tread portion, wherein the tread portion is provided with a tread ground contacting surface and at least one main groove having an opening at the tread ground contacting surface and extending continuously in a tyre circumferential direction, in a reference state in which the tyre is mounted on a standard rim, inflated to a standard inner pressure, and placed on a flat surface with zero camber angle, when the tread portion of the tyre is loaded with a standard tyre load, the tread ground contacting surface is in contact with the flat surface, the at least one main groove has a bottom surface and two groove wall surfaces extending outwardly in a tyre radial direction from the bottom surface, in a lateral cross section taken perpendicular to a length direction of the at least one main groove, only one of the two groove wall surfaces is provided with an inner groove wall portion connected with the bottom surface and a protruding portion connected with the inner groove wall portion and having a protruding end protruding inwardly in a groove width direction from a groove reference line obtained by extending the inner groove wall portion, the protruding portion has an inclined surface portion which is inclined and extends between the protruding end and the tread ground contacting surface, and in the reference state, when a tyre load of 1.20 times the standard tyre load is applied to the tread portion, the whole inclined surface portion is in contact with the flat surface.

* * * * *